(12) United States Patent
Dishon

(10) Patent No.: US 11,583,061 B2
(45) Date of Patent: Feb. 21, 2023

(54) ATTACHMENT PORTION FOR AN ELECTRIC TOOTHBRUSH REPLACEMENT HEAD

(71) Applicant: Ranir, LLC, Grand Rapids, MI (US)

(72) Inventor: Bryan J. Dishon, Alto, MI (US)

(73) Assignee: Ranir, LLC, Grand Rapids, MI (US)

( * ) Notice: Subject to any disclaimer, the term of this patent is extended or adjusted under 35 U.S.C. 154(b) by 238 days.

(21) Appl. No.: 17/024,808

(22) Filed: Sep. 18, 2020

(65) Prior Publication Data

US 2021/0100346 A1 Apr. 8, 2021

Related U.S. Application Data

(60) Provisional application No. 62/912,297, filed on Oct. 8, 2019.

(51) Int. Cl.
*A46B 5/00* (2006.01)
*A46B 7/04* (2006.01)
*A46B 9/04* (2006.01)
*A61C 17/22* (2006.01)

(52) U.S. Cl.
CPC ............ *A46B 5/0095* (2013.01); *A46B 7/042* (2013.01); *A46B 9/04* (2013.01); *A61C 17/222* (2013.01)

(58) Field of Classification Search
CPC ....... A61C 17/222; A46B 5/0095; A46B 7/04; A46B 7/042
See application file for complete search history.

(56) References Cited

U.S. PATENT DOCUMENTS 8,782,841 B2 7/2014 Sale et al.
2020/0085178 A1* 3/2020 Van Den Ende ...... A61C 1/142

FOREIGN PATENT DOCUMENTS

EP 2234561 A1 10/2010
WO 2010001197 A1 1/2010

* cited by examiner

*Primary Examiner* — Shay Karls
(74) *Attorney, Agent, or Firm* — Warner Norcross + Judd LLP

(57) ABSTRACT

A replacement toothbrush head includes a tubular sleeve having a brush at one end and a drive shaft receptacle at the opposite end. The receptacle extends into the sleeve from a mouth at a tube end to a shoulder spaced from the mouth within the tube. A coupling member is inserted into the receptacle, and a spring clip is positioned between the receptacle and the coupling member, the spring clip having a base positioned between the shoulder and the distal end of the coupling member and a pair of spring arms overlying the sidewall of the coupling member. At least one of the spring arms engages a flexible region of the coupling member such that the flexible region flexes to engage a drive shaft inserted into the coupling member and retain the replacement head on the drive shaft.

20 Claims, 5 Drawing Sheets

ATTACHMENT PORTION FOR AN ELECTRIC TOOTHBRUSH REPLACEMENT HEAD

BACKGROUND OF THE INVENTION

The present invention relates generally to a replacement head for an electric toothbrush, and more particularly to an attachment portion for retaining the replacement head onto an electric toothbrush drive unit.

Electric toothbrushes generally have a drive unit that includes a handle portion and a drive shaft. A drive mechanism is housed within the handle portion and the drive shaft extends from the handle portion and is driven rotationally or through a selected angle of oscillation by the drive mechanism. A removable replacement brush head assembly fits onto the extending driveshaft. The brush head assembly generally includes a hollow sleeve that supports the brush head at one end and includes an attachment portion at the opposite end. The attachment portion includes a coupling member that that fits into the attachment end of the sleeve. The drive shaft extends into the coupling member and is retained by the coupling member.

The interface between the drive shaft and the coupling member must be such as to reliably transfer the torque of the moving drive shaft to the brush head and to maintain the torque transfer under load. The load refers to a combination of the torque created by the inertial mass of the oscillating brushhead and the forces created by the interaction with the user's mouth. The interface must also be sufficient to axially hold the brush head on the driveshaft during operation of the toothbrush, while also permitting the brush head to be conveniently removed by the user. Axial retention can be a challenging aspect of such an arrangement if the replacement brushhead is to be removed regularly for cleaning or other purposes. The arrangement must be such that the functions of torque transfer and axial retention are not degraded even after the replacement head has been repeatedly cycled during the lifetime of the replacement brush head.

SUMMARY OF THE INVENTION

The present invention provides a replacement toothbrush head that attaches to a toothbrush drive unit in a manner that retains the brush head on the drive unit and prevents angular rotation of the brush head with respect to the drive unit. In addition, the present invention accommodates for tolerances in the various molded plastic pieces to provide a taut fit between the brush head and the drive shaft, and positive feedback for the user that the brush head is properly seated on the drive shaft.

In one embodiment, the replacement head includes a sleeve having a longitudinal length, a first end and a second end opposite said first end, the first end having a head supporting a plurality of cleaning elements extending from the head, the second end forming an opening extending along the longitudinal length for the insertion of a drive shaft. The replacement head further includes an attachment portion with a coupling element and a spring clip member. The coupling element includes a base end, a distal end extending into the opening in the second end of the sleeve, a sidewall extending between the base end and the distal end, the distal end facing the first end of the sleeve, and a drive shaft opening for receiving at least a portion of the drive shaft. In one embodiment, the spring clip member includes a base and a pair of spring clip arms extending from a first side of the base, the first side of the base extending over at least a portion of the distal end of the coupling member, the spring clip arms extending over and biased against said sidewall such that a portion of the sidewall is flexed inwardly for axial retention of the drive shaft.

In one embodiment, the sidewall of the coupling element includes a flexible bridge portion that is at least partially spaced from the remainder of the sidewall, wherein one of the spring clip arms is aligned on the bridge portion and causes the bridge portion to flex inwardly. In another embodiment, the exterior of the coupling element may have a keyed shape that corresponds to a matching keyed shape of the sleeve to prevent angular rotation of the coupling element with respect to the sleeve.

The spring clip may include at least one assembly tab extending from the second side of the base in a direction away from the coupling element. The attachment portion of the sleeve may include a shoulder within the opening, and the at least one assembly tab may abut the shoulder to provide a stop for the coupling member and spring clip within the sleeve.

In another embodiment, the drive shaft of the toothbrush drive unit may extend through the coupling member and abut the spring clip when the drive shaft is fully inserted into the replacement head to provide metal on metal user feedback of the placement of the replacement head on the drive shaft.

Figure 1:
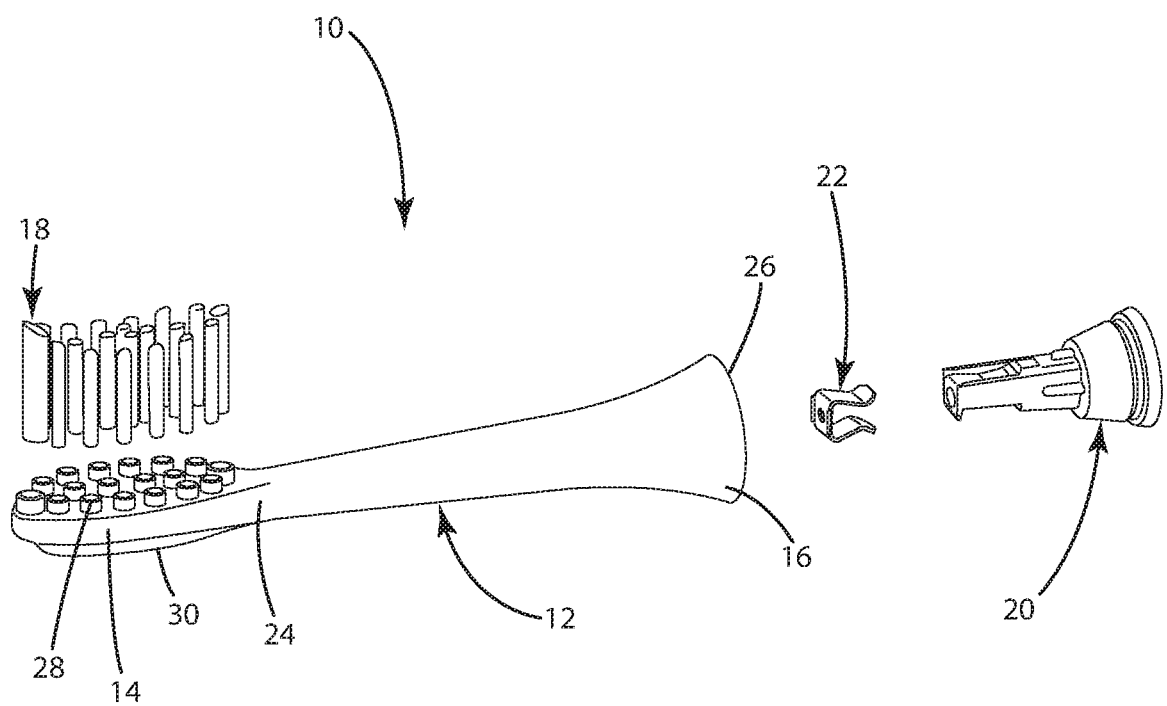
FIG. 1 is an exploded view of a replacement brush head according to one embodiment.
Figure 2:
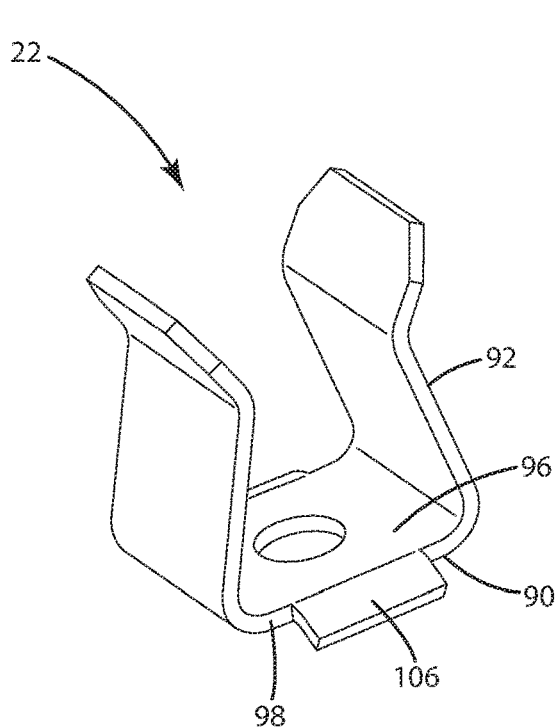
FIG. 2 is a perspective view of a spring clip according to one embodiment.
Figure 3:
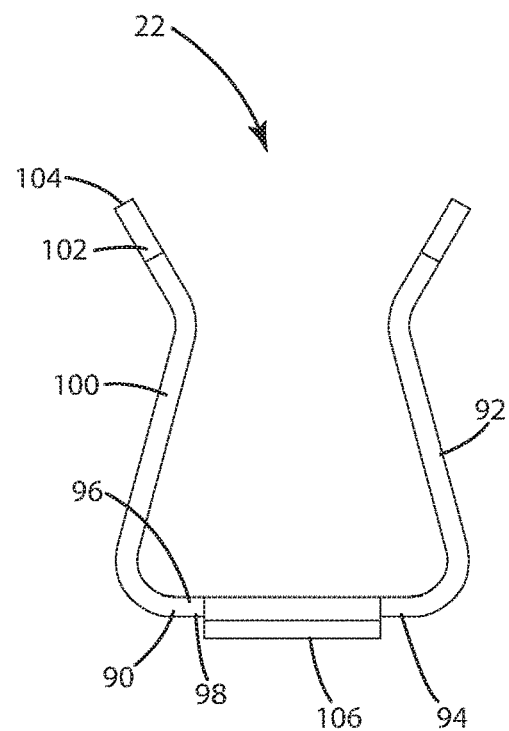
FIG. 3 is a front view thereof.
Figure 4:
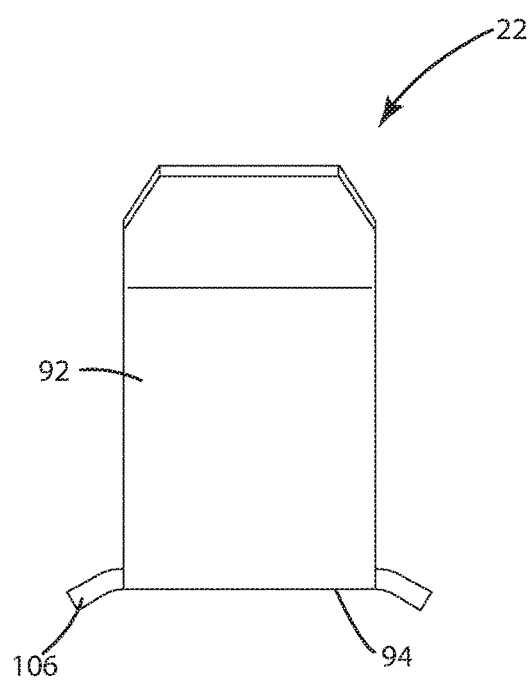
FIG. 4 is a side view thereof.
Figure 5:
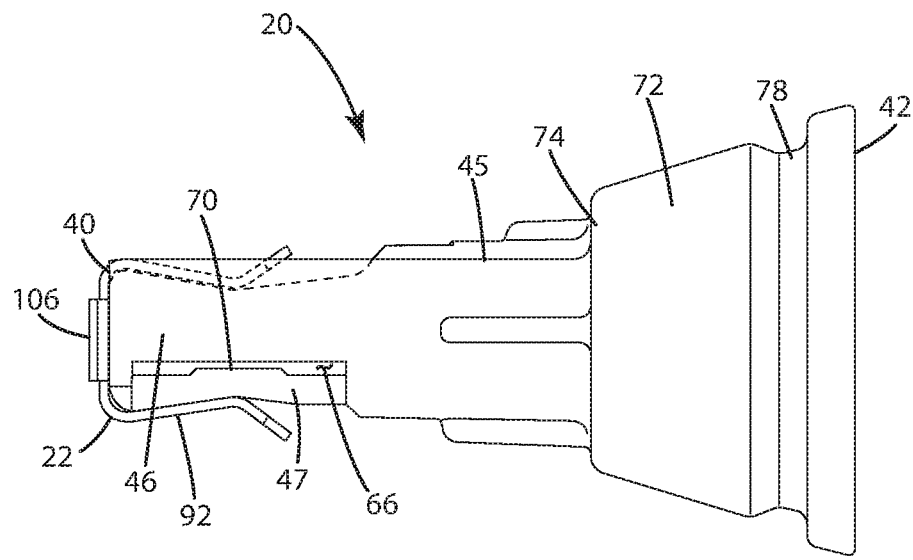
FIG. 5 is a side view of a coupling member and spring clip according to one embodiment.
Figure 6:
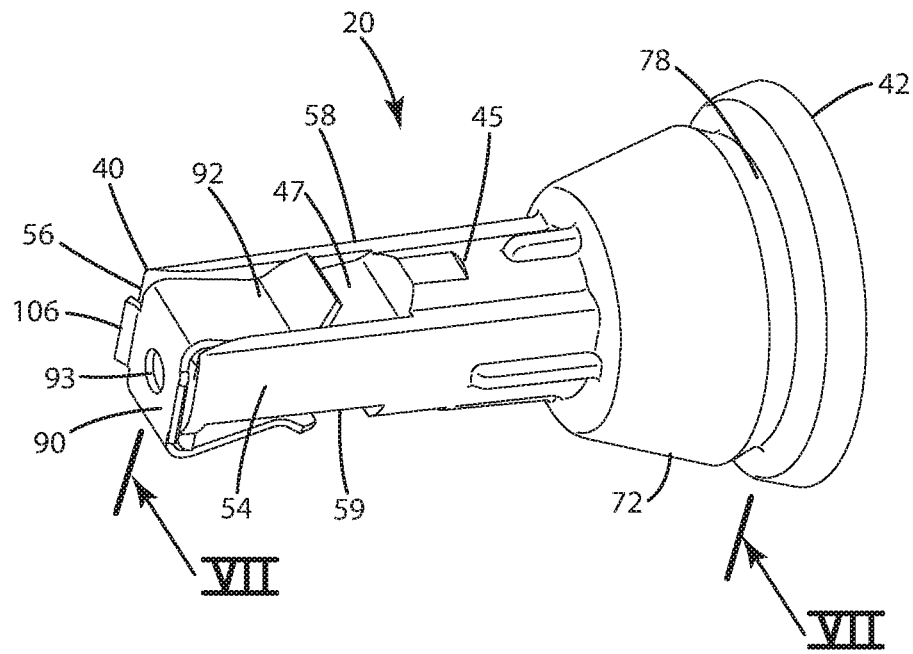
FIG. 6 is a perspective view thereof.
Figure 7:
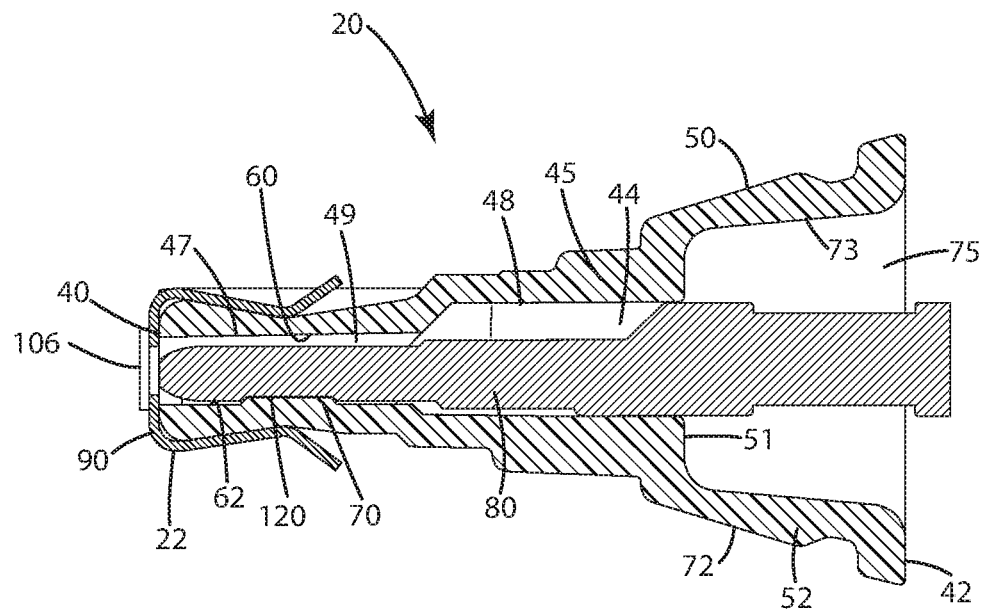
FIG. 7 is a side cross sectional view thereof taken along line VII-VII in FIGS. 6.
Figure 8:
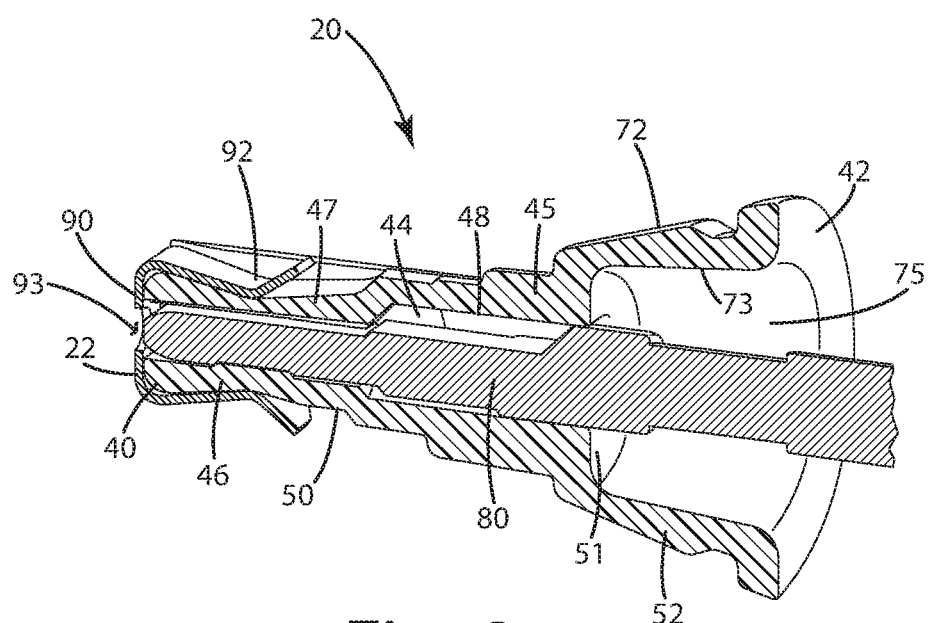
FIG. 8 is a perspective cross sectional view thereof.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENTS

The embodiments of the invention described herein relate to a replacement head for an electric toothbrush, and more particularly to an attachment system for retaining the replacement head on the drive shaft of an electric toothbrush. A replacement head is shown generally in FIG. 1 and generally designated 10.

I. Overview

According to one embodiment, the replacement head 10 includes a sleeve or tube 12 having a head 14 at one end and a receptacle 16 at the opposite end. The head 14 includes a plurality of cleaning elements 18. The replacement head 10 further includes a coupling member 20 and spring clip 22 for insertion into the receptacle 16 of the sleeve 12.

II. Structure

Figure 9:
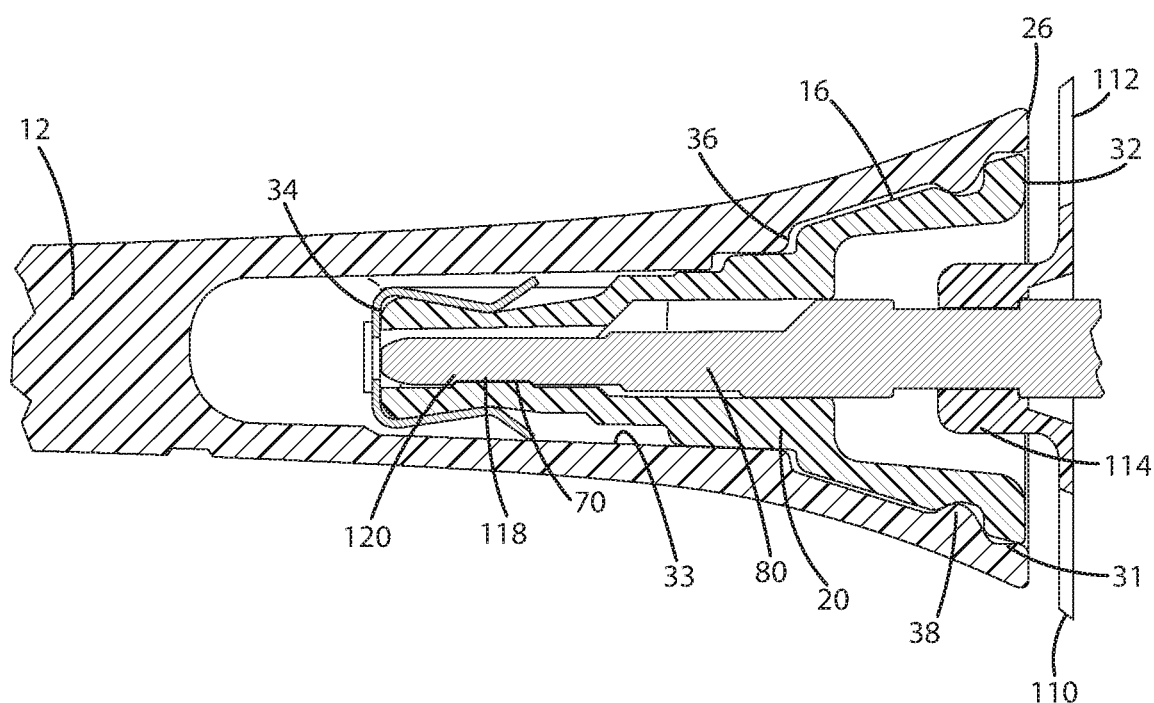
FIG. 9 is a side cross sectional view of a coupling member and replacement head with a drive shaft inserted.

Referring to FIGS. 1 and 9, the sleeve 12 is a tube having a first end 24 and a second end 26. The sleeve 12 may be formed from a molded plastic, with at least a portion at the second end 26 that is hollow. The sleeve 12 generally forms a longitudinal axis extending along the center of the sleeve length and through the hollow portion of the sleeve 12. The first end 24 supports a head 14, which may be one of many conventional toothbrush head arrangements. In the illustrated embodiment, the head 14 has a generally planar upper surface 28 and a lower surface 30 opposite the upper surface 28. The upper surface 28 supports a plurality of cleaning elements 18, which extend outwardly from the upper surface 28 and may be bristles arranged in bristle tufts, elastomeric cleaning elements, or a combination of bristle elements and elastomeric cleaning elements. In one embodiment, the head 28 may also include one or more elastomeric soft tissue cleaners, such as an elastomeric portion covering the lower surface 30 of the head 14.

The second end 26 of the sleeve 12 includes a receptacle 16 forming an opening 31 in the sleeve 12. The opening 31 may extend all or a portion of the longitudinal length of the sleeve 12, and the receptacle 16 may include all or a portion of the opening 31. In the illustrated embodiment, the receptacle 16 extends from a mouth 32 at the second end 26 of the sleeve 12 to a shoulder 34 spaced from the mouth 32 along the longitudinal length of the sleeve 12 and within the opening 31. The diameter of the receptacle 16 may increase approaching the mouth 32, and the inner wall 33 of the sleeve 12 within the receptacle 16 may include structure for receiving and retaining the coupling member 20. As illustrated, the shoulder 34 includes a radially inwardly extending wall portion that faces toward the second end 26 of the sleeve 12. In one embodiment, an intermediate shoulder 36 is positioned between the shoulder 34 and the mouth 32, and a rounded, annular rib 38 projects inwardly from the inner wall 34 adjacent to the mouth 32. In another embodiment, one or more of the shoulders 34, 36 and the rib 38 may be moved or eliminated as desired for retaining the coupling member 20 within the receptacle 16.

Referring to FIGS. 5-9, the coupling member 20 is sized and shaped to be inserted into the receptacle 16 and retained in the receptacle 16. The coupling member 20 may be formed from molded plastic and includes a first or distal end 40, a second end 42 and a sidewall 45 extending between the first 40 and second 42 ends. The sidewall 45 includes an interior surface 48 and an exterior surface 50. In the illustrated embodiment, the coupling member 20 is tubular, with the interior surface 48 defining an interior space 44 extending from the distal end 40 to the second end 42. In another embodiment, the coupling member 20 is only partially hollow, for example, with the distal end 40 closed.

In the illustrated embodiment, the coupling member 20 includes two portions. A first portion 46 extends from the distal end 40 to an internal shoulder 51 that is within the tube and extends radially inwardly from the interior surface 48. A second portion 52 extends from the shoulder 51 to the second end 42. The sidewall 45 of the first portion 46 includes generally flat left 54 and right 56 exterior side surfaces and generally flat exterior upper 58 and lower 59 surfaces forming a keyed shape that can interfit with the spring clip 22 and receptacle 16. The inner surface 48 may define an opening 49 having a keyed shape to receive and angularly retain the drive shaft 80, for example, with upper 60 and lower 62 flat interior surfaces. As shown, a portion of the sidewall 45 in the first portion 46 is flexible. In the illustrated embodiment, the flexible portion 47 is a bridge 47 that is partially separated from the sidewall 45 by slots 66 that enable the bridge 47 to flex with respect to the remainder of the sidewall 45. In an alternative embodiment, the flexible portion may be formed from a flexible material having different characteristics than the material of the coupling member 20, or may include multiple bridge portions. In the illustrated embodiment, the inner surface 48 of the bridge 47 includes a raised portion 70 designed to interfit with the drive shaft 80 as noted below. In yet another alternative embodiment, the sidewall 45 may include one or more cutouts in addition to, or instead of, the flexible portion 47.

The second portion 52 of the coupling member 20 includes an exterior surface 72 with structure to interfit with the receptacle 16 in the sleeve 12. As illustrated, the diameter of the exterior surface 72 increases approaching the second end 42 to generally match the shape of the receptacle 16. The exterior surface 72 may include an exterior shoulder 74 that is spaced proximate to or in an abutting relationship with intermediate shoulder 36 of the receptacle 16. The exterior 72 of the second portion 52 may also include a rounded, annular groove 78 for snap-fitting with the annular protrusion 36 on the receptacle 16 when the coupling member 20 is inserted into the receptacle 16. The second portion 52 includes an interior surface 73 that defines an opening 75 extending from the shoulder 51 to the second end 42. As shown, the opening 75 has a diameter larger than that of the opening 49 within the first portion 46 of the coupling member 20 to accommodate a portion of the toothbrush drive unit as described in more detail below.

The spring clip 22 is generally a stamped metal product, although other resilient materials and formation methods may be used. In one embodiment, the spring clip 22 includes a base 90, and a pair of spring clip arms 92 extending from the base 90, although, in an alternative embodiment, the spring clip my include only a single spring clip arm 92. More particularly, the base 90 includes an outer surface 94, an inner surface 96 opposite the outer surface 94, and four lateral side edges 98. In one embodiment, the base 90 defines a through hole 93 extending through the base 90 from the outer surface 94 and the inner surface 96. As illustrated, the base 90 is generally flat, and the spring arms 92 extend from two opposing side edges 98. The spring arms 92 are bent to extend at an angle from the base 90, and as shown the spring arms 92 are both bent to extend in the same direction, outwardly from the inner surface 96. The spring arms 92 each include a first portion 100 angled inwardly toward the other spring arm 92 such that the first portions collectively converge, and a second portion 102 angled outwardly such that the second portions 102 collectively diverge from one another approaching the distal ends 104 of the spring arms 92. In one embodiment, the spring clip 22 also includes a pair of assembly tabs 106. The assembly tabs 106 extend from the other two opposing side edges 98 and are bent at an angle from the side edges 98 to extend away from the outer surface 94 of the base 90 and generally in the opposite direction as the spring clip arms 92. In the illustrated embodiment, the tabs 106 are bent at approximately a 30 degree angle from the base 90, although other angles may otherwise be used.

The replacement head 10 is designed for attachment to an electric toothbrush drive unit 110. The structure and operation of drive units may vary, but will generally include a housing that forms a handle and houses a motor, and a drive shaft that is driven by the motor and extends from one end of the housing. The drive shaft may be driven in one or more of a variety of motions, including, but not limited to, rotational oscillation, angular displacement and axial oscillation. With reference to FIG. 9, the replacement head 10 is shown attached to one embodiment of a drive unit 110. A small portion of the housing handle 112 is shown, along with an attachment portion 114 of the housing that extends from the housing handle 112. The drive shaft 80 extends outwardly from the attachment portion 114. The drive shaft 80 is provided with a keyed shape that will be inserted into the coupling portion 20 and will resist angular rotation with respect to the coupling portion 20. In the illustrated embodiment of a drive shaft, the drive shaft 80 has flat upper 116 and lower 118 surfaces for interfitting with the coupling portion 20. In one embodiment, the lower surface 118 includes a recessed portion 120 shaped to receive the raised portion 70 of the coupling member 20.

III. Assembly

An assembled version of the coupling member 20 and spring clip 22 with a drive shaft 80 inserted into the coupling member 20 is shown in FIGS. 5-8, and a fully assembled version of the replacement head 10 attached to a toothbrush drive unit 110 is shown in FIG. 9. FIGS. 5-8 show the clip 22 attached over the coupling member to enable the retention of a drive shaft 80 within the coupling member 20. The spring clip 22 is attached over the distal end 40 of the coupling member 20, for example, by sliding the spring clip arms 92 over the distal end 40 such that the arms 92 engage the flat upper 58 and lower 59 surfaces of the first portion 50 of the coupling member 20. One of the clip arms 92 engages the flexible portion 47 of the sidewall 45 to flex the flexible portion inwardly. In the illustrated embodiment, the clip arm 92 engages the bridge 47 and flexes the bridge 47 inwardly. When the clip 22 is fitted onto the coupling member 20, the base 90 lies against the distal end 40 of the coupling member 20 and the assembly tabs 106 extend in a direction away from the distal end 40. In one embodiment, the through hole 93 aligns with the opening in the distal end 40 to enable drainage through the sleeve 12 and coupling member 20.

As further shown in FIGS. 5-8, with the spring clip 22 in place on the coupling member 20, the coupling member 20 functions to prevent both angular rotation of the coupling member 20 with respect to the drive shaft 80 and axial removal of the coupling member 20 from the drive shaft 80. Angular rotation is primarily prevented by the corresponding keyed shapes of the drive shaft 80 and the internal surface 48 of the coupling member 20. More particularly, in the illustrated embodiment, angular rotation is prevented by the engagement of the flat upper 116 and lower 118 surfaces of the drive shaft 80 with the flat internal surfaces 60 and 62 within the coupling member 20. Axial removal (i.e., pulling the coupling member 20 from the drive shaft 80) is prevented by the force of the spring clip 22 on the flexible bridge 47, which is transferred to the drive shaft 80 extending into the coupling member 20 with the inner surface 48 of the bridge member 47 pressing on the surface 118 of the drive shaft 80. In an embodiment where the inner surface 48 of the bridge 47 includes a raised portion 70, the raised portion may interfit into the recessed portion 120 of the drive shaft 80 to assist in preventing axial removal. In the alternative embodiment where the sidewall 45 of the coupling member 20 includes a cutout instead of the flexible member 47, the spring clip 22 may be fitted over the coupling member 20 such that the clip arm 92 extends through the cutout and into direct engagement with the drive shaft 80 to axially retain the drive shaft.

FIG. 9 shows the assembled brush head 10 with drive shaft 80 inserted. More particularly, FIG. 9 shows a cross section of a portion of the sleeve 12 with the coupling member 20, spring clip 22, drive shaft 80 and the attachment portion 114 of a drive unit 110 inserted. The spring clip 22 is mounted on the coupling member 20 and the drive shaft 80 is inserted and retained in the coupling member 20 as described above in connection with FIGS. 5-8. The coupling member 20 and spring clip 22 are inserted into the receptacle 16 in the sleeve 12. As shown, the coupling member 20 snap fits within the receptacle 16. In the illustrated embodiment, the snap fit occurs between the rounded, annular groove 78 on the coupling member 20 and the annular protrusion 36 on the receptacle 16, although other alternative snap fit or friction fit retention mechanisms may be used. The keyed exterior shape of the coupling member 20 and the interior shape of the receptacle 16 interfit with one another to prevent angular rotation of the coupling member 20 with respect to the sleeve 12.

In one embodiment, when the coupling member 20 and spring 22 are inserted longitudinally into the mouth 32 and through the opening 31 of the receptacle 16, the spring clip arms 92 are sandwiched between the inner wall 34 of the receptacle 16 and the coupling member 20 and the base 90 of the spring clip 22 is sandwiched between the distal end 40 of the coupling member 20 and the shoulder 34 at the end of the receptacle 16. As shown in FIG. 9, the spring assembly tabs 106 angle outward to abut and engage the shoulder 34 on the sleeve 12, which can be useful in accounting for tolerances in the various molded plastic parts and can provide a force within the assembly that creates a tight fit among the various parts to reduce unwanted noise. As also shown in FIG. 9, the drive shaft 80 extends through the distal end 40 of the coupling member 20 to abut the base 90 of the spring clip 22. In this embodiment, the spring clip 22 provides the end of travel for the drive shaft 80, which acts to provide a positive feel of metal against metal for the user, and gives the user feedback that the brush head 10 is fully installed. Finally, when fully inserted, the attachment portion 110 of the drive unit 110 is positioned within the opening 75 of the coupling member 20.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A replacement toothbrush head, comprising:
   a sleeve including a longitudinal length, a first end and a second end opposite said first end, said first end having a head supporting a plurality of cleaning elements extending from said head, said second end forming an opening extending along said longitudinal length for the insertion of a drive shaft; and
   an attachment portion including a coupling element and a spring clip member, said coupling element including a base end, a distal end extending into said opening in said second end of said sleeve, and a sidewall extending between said base end and said distal end, said distal end forming a wall extending at an angle from said sidewall and facing said first end of said sleeve, said coupling element including a drive shaft opening for receiving at least a portion of the drive shaft, said spring clip member including a base and at least one spring clip arm unitary with said base and extending at an angle from a first side of said base, said first side of said base extending over at least a portion of said distal end of said coupling member, said at least one spring clip arm extending over and biased against said sidewall such that a portion of said sidewall is flexed inwardly for retention of the drive shaft.

2. The replacement toothbrush head of claim 1 wherein said sidewall of said coupling element includes a flexible bridge portion at least partially spaced from said sidewall, wherein said at least one spring clip arm is aligned on said bridge portion and causes said bridge portion to flex inwardly.

3. The replacement toothbrush head of claim 1 wherein said spring clip base has a second side opposite said first side, wherein said spring clip base includes at least one assembly tab extending from said second side of said base.

4. The replacement toothbrush head of claim 1 wherein said spring clip base defines a through hole.

5. The replacement toothbrush head of claim 1 wherein said coupling member includes structure for interfitting with said second end of said sleeve.

6. The replacement toothbrush head of claim 5 wherein one of said sidewall of said coupling member and said second end of said sleeve includes an annular protrusion and the other of said sidewall of said coupling member and said second end of said sleeve includes an annular channel such that said protrusion snap fits into said channel.

7. The replacement toothbrush head of claim 6 wherein said attachment portion of said sleeve includes a shoulder within said opening, and wherein said at least one assembly tab of said spring clip abuts said shoulder.

8. The replacement toothbrush head of claim 7 wherein said bridge includes an outer surface contacted by said at least one spring clip arm and an inner surface opposite said outer surface, said inner surface including a raised portion that interfits with a notch on the drive shaft.

9. A replacement toothbrush head, comprising:
   a hollow tube having a brush at one end and a drive shaft receptacle at the opposite end, said tube having a longitudinal axis, said receptacle extending into said tube along said longitudinal axis from a mouth at a tube end to a shoulder spaced from said mouth within the tube along said longitudinal axis;
   a coupling member inserted into the receptacle, said coupling member having an open end, a distal end, and a sidewall extending between said distal end and said open end, said distal end facing said shoulder and forming a wall extending at an angle with respect to the sidewall and the longitudinal axis of the tube, said sidewall including a flexible region, said coupling member defining an interior space with a keyed shape for preventing rotation of a drive shaft inserted into the coupling member and receptacle; and
   a unitary, U-shaped spring clip positioned between said receptacle and said coupling member, said spring clip having a base and a pair of spring arms extending from said base, said base overlying said distal end of said coupling member and positioned between said distal end and said shoulder said spring arms overlying at least a portion of said sidewall, at least one of said spring arms engaging said flexible region of said sidewall and flexing said flexible region toward said interior space of said coupling member.

10. The replacement toothbrush head of claim 9 wherein said spring clip arms extend in a first direction from said base, wherein said spring clip includes a pair of spring assembly tabs extending in a second direction from said base, said spring assembly tabs engaging said shoulder.

11. The replacement toothbrush head of claim 10 wherein said flexible region is a bridge that is at least partially spaced from said sidewall.

12. The replacement toothbrush head of claim 11 wherein said bridge includes opposing sides, said opposing sides each spaced from said sidewall by a slot.

13. The replacement toothbrush head of claim 12 wherein said distal end defines a coupling member drainage hole, and wherein said base defines a spring clip draining hole aligned with said coupling member drainage hole.

14. The replacement toothbrush head of claim 13 wherein said bridge includes an outer surface engaging said spring clip and an inner surface opposite said outer surface, said inner surface including a raised portion for engaging a toothbrush drive shaft.

15. A system for attachment of a replacement toothbrush head onto an electric toothbrush drive, comprising:
   a drive shaft capable of being driven to oscillate at a desired frequency, said drive shaft extending along a longitudinal axis, said drive shaft having an external surface defining a keyed shape;
   a replacement brush head including a hollow tube having a brush at one end and a drive shaft receptacle at the opposite end, said tube extending along said longitudinal axis, said receptacle extending into said tube along said longitudinal axis from a mouth at a tube end to a shoulder spaced from said mouth within the tube along said longitudinal axis;

a coupling member inserted into the receptacle, said coupling member having an open end, a distal end, and a sidewall extending between said distal end and said open end, said distal end extending generally perpendicular to said longitudinal axis of said drive shaft and facing said shoulder, said coupling member defining an interior space with a keyed shape corresponding to said keyed shape of said drive shaft for preventing rotation of said drive shaft inserted into the coupling member and receptacle; and a unitary, U-shaped spring clip positioned between said receptacle and said coupling member, said spring clip having a base and a pair of spring arms extending from said base, said base positioned between said shoulder and said distal end;

wherein said drive shaft is inserted into said interior space of said coupling member, and at least one of said spring arms engages at least one of said sidewall and said drive shaft to axially retain said coupling member on said drive shaft.

16. The system for attachment of claim 15 wherein said sidewall includes a flexible bridge that is at least partially spaced from said sidewall, at least one of said spring arms overlying said flexible bridge and flexing said flexible bridge toward said interior space of said coupling member such that said flexible bridge engages said drive shaft to axially retain said coupling member on said drive shaft.

17. The system for attachment of claim 15 wherein said keyed shape of said drive shaft includes at least one flat surface, and wherein said keyed shaped of said interior space of said coupling member includes at least one flat surface aligned with said drive shaft flat surface.

18. The system for attachment of claim 15 wherein said drive shaft engages said spring clip base.

19. The system for attachment of claim 18 wherein said spring clip arms extend in a first direction from said base, wherein said spring clip includes a pair of spring assembly tabs extending in a second direction from said base, said spring assembly tabs engaging said shoulder.

20. The system for attachment of claim 19 wherein said flexible bridge includes an outer surface engaging said spring clip and an inner surface opposite said outer surface, said inner surface including a raised portion, wherein said drive shaft includes a notch aligned with said raised portion, said raised portion interfitting with said notch to prevent axial removal of said drive shaft.

* * * * *

UNITED STATES PATENT AND TRADEMARK OFFICE
CERTIFICATE OF CORRECTION

PATENT NO. : 11,583,061 B2
APPLICATION NO. : 17/024808
DATED : February 21, 2023
INVENTOR(S) : Bryan J. Dishon Page 1 of 1

It is certified that error appears in the above-identified patent and that said Letters Patent is hereby corrected as shown below:

In the Claims

Column 8, Claim 9, Line 30:
After "said shoulder" insert -- , --

Column 10, Claim 17, Line 6:
"shaped" should be -- shape --

Signed and Sealed this
Fourth Day of April, 2023

Katherine Kelly Vidal
*Director of the United States Patent and Trademark Office*